Oct. 18, 1966   E. L. STEVENS ET AL   3,279,277
ADJUSTABLE STEERING WHEEL
Filed Dec. 4, 1964   2 Sheets-Sheet 1

INVENTORS
Edwin L. Stevens
Eugene J. Krukow
S. Daniel Aulderton
Atty.

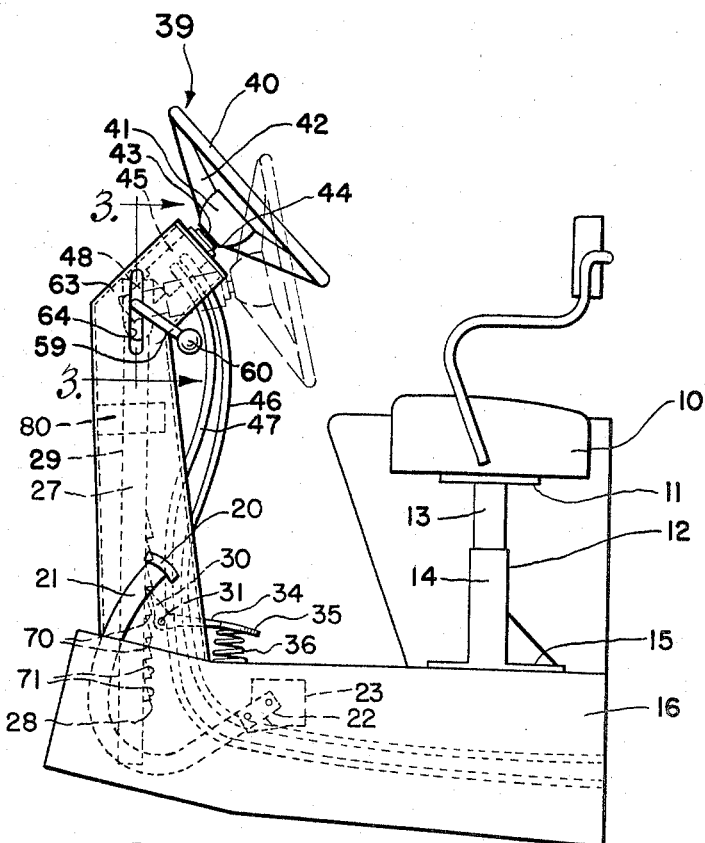
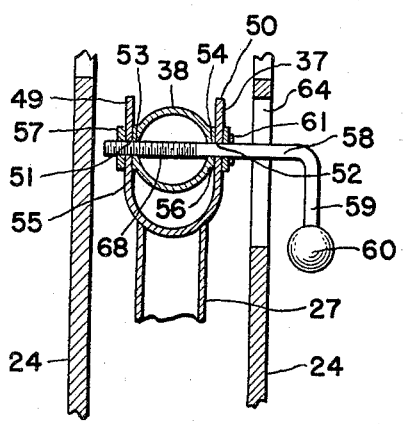

United States Patent Office 3,279,277
Patented Oct. 18, 1966

3,279,277
ADJUSTABLE STEERING WHEEL
Edwin L. Stevens, Rock Island, and Eugene J. Krukow, Moline, Ill., assignors to International Harvester Company, a corporation of Delaware
Filed Dec. 4, 1964, Ser. No. 415,939
5 Claims. (Cl. 74—493)

The instant invention relates to steering wheels. Particularly the instant invention relates to an adjustable vehicular steering wheel which is adapted for use in steering systems of a class in which there is no operative mechanical connection between the operator's steering or control wheel and the steerable wheels of the associated vehicle. A steering system such as this is disclosed in U.S. Patent 3,059,717 to D. W. Moyer et al., of October 23, 1962. Reference may be made to this patent for a detailed disclosure of a steering system of the type referred to above.

Steering system of the designated class generally employ hydrostatic steering means. However, while the instant invention is illustrated and adapted for use in such a steering system, it is intended that it be limited neither by such a system nor by the details of construction thereof.

The instant invention has for its primary object the provision of an improved adjustable steering wheel mechanism.

Another object of the instant invention is the provision of an improved adjustable mechanism adapted for the steering wheel of a hydrostatic steering means.

A still further object of the instant invention is to provide, in a steering system which may be hydrostatic or fluid powered steering system, a steering wheel which is adjustable for both height and angle and which comprises few, simply arranged mechanical components by reason of which steering wheel adjustability is efficiently and inexpensively achieved.

The foregoing and other objects, features and advantages of the instant invention will become more apparent upon consideration of the following description and appended claims, when considered in conjunction with the accompanying drawings wherein the same reference character or numeral refers to like or corresponding parts throughout the several views.

On the drawings:

FIG. 2 is a side elevational view of the embodiment shown in FIG. 1, parts being shown in dotted lines for purpose of illustration.

FIG. 3 is a transverse sectional view taken along the line 3—3 of FIG. 2 and looking in the direction of the arrows.

Figure 1:
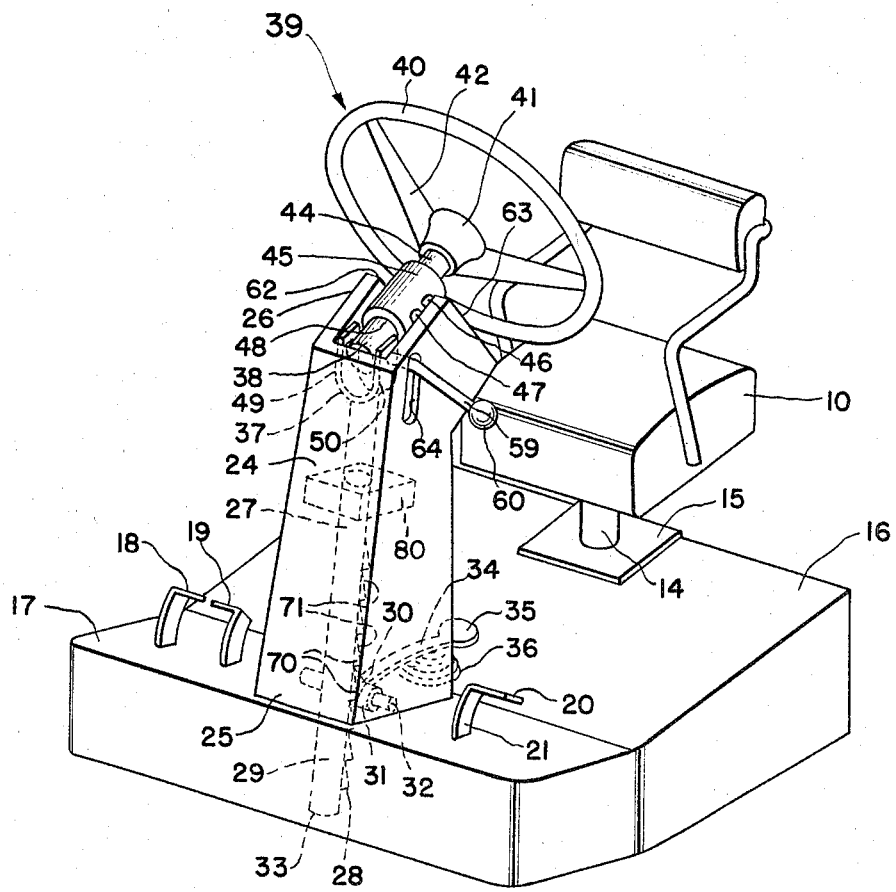
FIG. 1 is a perspective view of one embodiment of the instant invention shown in mounted position in a vehicle, with parts being shown in dotted lines for the purposes of illustration.

Referring now more particularly to the drawings, the interior of a cab or an operator's section of a vehicle is shown disclosing a seat structure or chair 10 which is carried on a upper flange 11 of a pedestal generally designated by numeral 12. As illustrated in FIG. 2, the pedestal may comprise telescoping or adjustable sections 13 and 14, the lowermost of which may have a wide base flange or mounting plate 15 which is rigidly secured by any suitable or conventional means to the floor 16 of the vehicle cab.

As illustrated in FIG. 1, extending upwardly from the front portion 17 of the cab floor 16 are a plurality of pedals 18 and 19 which may be employed as foot levers for controlling various of the vehicular operations. An additional pedal 21 is seen in FIG. 1 and also in elevation in FIG. 2. The pedal 21 comprises a curved arm which extends through the front portion 17 of the floor 16 to provide an upper end portion 20 which is in spaced relation from the pedals 18 and 19. At its opposite end portion 22, the pedal is connected to a pedal controlled mechanism 23, which is disposed below floor 16 and illustrated only diagrammatically in FIG. 2. Neither the construction nor the function of mechanism 23 is critical to the instant invention.

As illustrated in FIGS. 1 and 2 of the drawings, a steering wheel base, pedestal, stand, mounting or housing 24 has its lower end portion 25 rigidly secured to the forward end portion 17 of the cab floor 16. The stand 24 is disposed between the pedals 18 and 19 which are shown on the right side of the stand 24 and the pedal extension 20 which is shown on the other side of stand 24. The stand 24 is spaced forwardly of the chair 10 in a position which would be in normal alignment with an operator occupying said chair.

The stand 24 is erect, extending vertically upwardly from the floor 16. It has, however, an angularly bent upper end portion or extension 26 which is offset from the main body of the stand 24 angularly upwardly in the direction of the seat 10, as illustrated in FIGS. 1 and 2.

The stand 24 is hollow, and an elongated vertically extending rod, post or mast 27 is mounted therein. The post 27 is slidably mounted, for example, in a bushing 80. As illustrated in FIG. 1, the post 27 has a lower end extension 33 which is disposed below the surface of the floor 16. Additionally, said post 27 is adjustable vertically, longitudinally of its length.

Vertical adjustment of post 27 is achieved by reason of an elongated ratch, strip or bar 28 which extends longitudinally of and is rigidly secured on or integral with a front face 29 of post 27. A click, pawl or detent 30 is mounted in vertically adjustable engagement with the teeth of the ratch 28. That is, the teeth of ratch 28 have broad bases or flats 70 from which front surfaces 71 slope inwardly and upwardly toward post 27. The pawl 30 releasably engages bases 70 of the teeth of ratch 28, whereby the post is held from moving downwardly. To lower post 27, the pawl 30 is withdrawn from ratch engagement and the post 27 is manually adjusted, and then the pawl is re-engaged. To raise the post 27, only manual elevation is required. Pawl 30 need not be disengaged from the ratch 28 as it will slip over surfaces 71.

To the end that the pawl 30 will operate, it may be carried on a collar 31 which is journalled on an axis pin, shaft or rod 32. The rod 32 is suitably secured in housing 24 by any conventional means and spaced from ratch 28. The pawl 30 slopes forwardly toward the ratch 28 through a rear opening between the sides of the housing 24, and a curved lever 34 the inner end portion of which is secured to the collar 31 extends in the opposite direction rearwardly toward the seat 10. At its inner end portion, the arm or lever 34 has an integral pedal extension 35 adapted to be depressed by the foot of an operator occupying the seat 10. At its outer end portion, which may be at the junction with the pedal extension 35, the lever 34 is spaced upwardly from the floor 16 a short distance. A compression spring 36 is disposed between lever 34 and the floor 16, and said spring 36 has its opposite ends bearing against each, respectively, as illustrated in FIGS. 1 and 2 of the drawings.

The compression spring 36 normally urges the lever 34, the axis of rotation of which is provided by pin 32, counterclockwise with respect to FIG. 2 to drive pawl 30 toward the ratch 28 to lock thereby the post 27 in adjusted position. To release the post 27 for downward adjustment thereof, an operator would apply pressure on the pedal extension 35 to rotate the pawl 30 out of engagement with the teeth of ratch 28. Thereby, the post 27 would be unlocked and freed to fall.

At its upper end portion, the post 27 is bifurcated in a U-shaped extension or yoke 37 comprising arms 49 and 50. The yoke or U-shaped extension 37 may be integral with the post 27. As illustrated in the drawings, the lower end portion 38 of a steering wheel assembly generally designated as 39 is adjustably secured to yoke 37 in a manner hereinafter to be described.

As illustrated in FIGS. 1 and 2, the steering wheel mechanism 39 may be part of a hydrostatic or fluid powered system which comprises a wheel rim 40 disposed about a wheel hub 41 to which said rim 40 is connected by means of spokes 42. A pin 43 or the like may have its outer end portion secured in the hub 41, and its opposite end portion secured to a rotor 44 which is journalled in a hydrostatic or fluid power cylinder 45.

Fluid transmission lines 46 and 47, the upper end portions of which are mounted in the cylinder 45, connect at their opposite ends to means (not shown) for actuating steerable wheels of the vehicle in response to the position of the steering wheel 40 and rotor 44 which is operably connected thereto.

As previously indicated, the details of construction of the hydrostatic or fluid powered portions of the steering system are not critical to the instant invention which may be adaptable to various vehicle steering systems which will be evident to those skilled in the art.

A connector 48, being a tube or hollow post or the like, is operably connected to and is carried by the steering wheel mechanism 39 from which said connector 48 extends downwardly. The lower integral end portion 38 of said tube or post 48, and heretofore identified, is rockably mounted between the arms 49 and 50 or in the bifurcation of the yoke 37. Thereby, the steering wheel mechanism 39 is adjustable rockably in a vertical plane and angularly with respect to post 27, as will become hereinafter additionally apparent.

The arms 49 and 50 of the yoke or U-shaped member 37 have a pair of horizontally aligned apertures 51 and 52, respectively, and most clearly seen in FIG. 3. The inner end portion 38 of the connector 48 also has a pair of diametrically opposed apertures 53 and 54 which are alignable with the apertures 51 and 52 to accommodate an elongated threaded member such as a rod or pin 58 which extends through all of said apertures in the manner the nature of which will be hereinafter described.

A pair of grippable pads or bosses 55 and 56 which may be integral with the lower end portion 38 of the connector 48 are disposed on diametrically opposite outer surfaces of said lower end portion 38 about the apertures 53 and 54, respectively. The outer surfaces of the pads or bosses 53 and 54 normally bear against the inner surfaces of the arms 49 and 50 of the U-shaped member or yoke 37 about apertures 51 and 52, respectively. On the outer surface of the arm 49, a nut-like internally threaded flange or annulus 57 is rigidly secured about the aperture or opening 51. The aperture or opening 51 may be threaded together with said flange or annulus 57.

An elongated portion 68 of the pin or rod 58 is partly threaded. The opposite end portion 59 of said rod 58 is a right angularly offset extension terminating in a handgripping ball member 60 which is secured by any conventional means on the outer end of said extension 59. The threads on the extension 68 match the threads of the flange or annulus 57. Thereby, the rod portion 68 may be manually threaded through said flange or annulus 57.

A flange, boss or ring 61 is rigidly connected to the elongated part 68 of rod or pin 58 outwardly of arm 50 and adjacent the bent portion 59. The flange 61 extends radially from the longitudinal axis of the rod or pin portion 68. Thereby, as the threaded member 58 is threaded to the left with respect to FIG. 3, the flange 61 will engage the outer surface of the arm 50 about the aperture 52 and apply an increasing force on the outer surface of said arm 50.

The arms 49 and 50 of the yoke have a metallic resiliency and will yield somewhat to the pressure of the advancing flange 61 to impinge tightly the arms 49 and 50 against the pads 55 and 56 to hold the steering wheel in adjusted positions. By rotating the threaded member 58 to move it to the right with respect to FIG. 3, the pressure of the arms 49 and 50 on pads 55 and 56 will be released gradually to free the steering wheel mechanism 39 for adjustment.

The apertures 53 and 54 preferably are a little larger than the diameter of the rod portion 68, whereby the steering wheel 40 may be easily rocked. The rocking adjustment of steering mechanism 39 is about an axis provided by the rod portion 68 upwardly and downwardly in a vertical plane. To the end that the rocking, as aforesaid, of the steering wheel mechanism 39 is unimpaired, the upper extended portion 26 of the stand 24 merely comprises a pair of horizontally spaced apart arms or plates 62 and 63 between which the connector 48 is rockable and from which the steering wheel mechanism 39 extends angularly upwardly, as illustrated in FIGS. 1 and 2.

As illustrated in FIGS. 1 and 2, the stand 24 has an elongated vertical slot 64 on one side which extends into the arm 63. The elongated portion 68 of threaded member 58 extends through slot 64, with bent portion 59 disposed outwardly of the stand 24 on the side of plate 63.

Inasmuch as the threaded member 58 is secured to post 27, as herein described, vertical adjustment of the post 27 is limited by the length of the slot 64 upon engagement of the opposite ends of said slot 64 with rod portion 68.

From the foregoing, it is apparent that an exceedingly simple combination of components provides the feature of adjustability of both height and angle in a steering mechanism. The invention has particular timeliness because of its adaptability for use in hydrostatic or fluid power steering systems, the use of which is becoming standard in practically all manually steerable vehicles.

As many substitutions or changes could be made in the above described construction, and as many apparently widely different embodiments of the invention within the scope of the claims could be constructed without departing from the scope and spirit thereof, it is intended that all matter contained in the accompaning specification shall be interpreted as being illustrative and not in a limiting sense.

What is claimed is:

1. An adjustable steering wheel mechanism for steerable vehicles and the like and comprising
   a casing having a forward opening and a vertical slot;
   an elongated vertically adjustable post mounted in said casing, an elongated rachet arranged axially of and secured to said post;
   a pedal operated pawl extended through said casing and adapted to releasably engage said rachet to support said post in vertically adjusted positions;
   a pair of spaced apart arms carried on an upper end portion of said post;
   a steering wheel having a mounting extension disposed between said arms;
   a threaded member extending through said arms and said extension and providing an axis of rocking for said steering wheel, said threaded member also extending through said vertical slot formed in the casing such that said slot limits the ragne of vertical adjustment of said post; and
   said arms actuatable by rotation of said threaded member for releasably securing said steering wheel in adjusted positions relative to said spaced apart arms.

2. An adjustable steering wheel mechanism for steerable vehicles comprising:
   a post;

a steering wheel apparatus rockably mounted on the upper end portion of said post;

means for rockably mounting and releasably securing said steering wheel apparatus in angularly adjusted positions;

said means for rockably mounting and releasably securing the steering wheel apparatus including, clamp means and a member mounted on an upper end portion of said post providing a fixed axis of rocking for said steering apparatus and a lower end portion of said steering wheel apparatus disposed about said member and mounted in said clamp means.

3. The device defined in claim 2 in which mounting and securing means comprises a pair of spaced arms mounted on an upper end portion of said post;

said member supported by said arms and extending therethrough, said steering wheel apparatus rockably mounted on said member, whereby said steering wheel apparatus can be adjustably secured by said arms.

4. An adjustable steering wheel mechanism for steerable vehicles and the like having a supporting floor, said steering wheel mechanism comprising:

a casing having a vertically extending slot formed therein carried by said supporting floor;

a vertically adjustable elongated post disposed within said casing and extending through said supporting floor;

operator controlled means for vertically adjusting and releasably holding said post in vertically adjusted positions;

a steering wheel apparatus including a steering wheel extension protruding downwardly therefrom and rockably mounted by connector means on the upper end portion of said post;

said connector means including a member extending through said vertically extending slot forming limiting means for defining the range of vertical adjustment of said post; and said connector means including clamp means operably connected to the member for releasably securing said steering wheel apparatus in adjusted angular position relative to said post.

5. The device defined in claim 4 in which the clamp means comprises a pair of clamp arms carried on said post, said steering wheel extension disposed between said arms;

a threaded portion of said member carried by one of said arms, and a boss carried on said member outwardly of the other of said arms, whereupon rotation of said member the boss is drawn into arm engagement to force said arms to grip said steering wheel extension.

References Cited by the Examiner

UNITED STATES PATENTS

| | | | |
|---|---|---|---|
| 804,375 | 11/1905 | Buffum | 74—493 X |
| 2,836,079 | 5/1958 | Salch | 74—493 |
| 2,845,810 | 8/1958 | Sampson | 74—493 |
| 2,903,904 | 9/1959 | Mackie | 74—493 |
| 2,929,263 | 3/1960 | Felts | 74—493 |
| 3,032,134 | 5/1962 | Banker | 74—493 X |
| 3,144,785 | 8/1964 | Steiner et al. | 74—493 |
| 3,167,971 | 2/1965 | Zeigler et al. | 74—493 |

MILTON KAUFMAN, *Primary Examiner.*